United States Patent [19]

Goertz

[11] 4,182,436
[45] Jan. 8, 1980

[54] BRAKE APPARATUS FOR A SCREW MACHINE

[75] Inventor: Ronald A. Goertz, Wichita, Kans.

[73] Assignee: Screw Machine Products, Inc., Wichita, Kans.

[21] Appl. No.: 869,685

[22] Filed: Jan. 16, 1978

[51] Int. Cl.² .............................................. F16D 49/10
[52] U.S. Cl. ................................................. 188/77 R
[58] Field of Search ............. 188/77 R; 192/80, 99 B, 192/144, 148, 149

[56] References Cited

U.S. PATENT DOCUMENTS

| 1,631,540 | 6/1927 | Le Munyon et al. | 188/77 R |
| 1,633,644 | 6/1927 | McGuiness | 188/77 R |
| 1,646,539 | 10/1927 | Johnson | 188/77 R |
| 2,330,555 | 9/1943 | Cameron | 192/144 |
| 3,313,379 | 4/1967 | Dence | 188/77 R |
| 3,557,911 | 1/1971 | Ellard | 188/77 R |
| 4,058,189 | 11/1977 | Chamberlain et al. | 188/77 R |

FOREIGN PATENT DOCUMENTS

| 493147 | 7/1919 | France | 188/77 R |
| 529829 | 12/1921 | France | 188/77 R |

*Primary Examiner*—Edward R. Kazenske
*Attorney, Agent, or Firm*—Phillip A. Rein

[57] ABSTRACT

This invention is a brake apparatus connected to a screw machine to supplement the normal braking system therein. The brake apparatus includes an actuator assembly connected to a brake assembly. The actuator assembly includes an elongated connector rod having an actuator handle assembly connected to each opposite end of the connector rod and operable to move same axially. The brake assembly includes (1) an actuator arm assembly secured to the connector rod; (2) a support and linkage assembly connected to the actuator arm assembly; and (3) a brake band assembly connected to the support and linkage assembly. The brake band assembly includes a brake band member engagable with a brake drum member which, in turn, is operably connected to the main drive shaft of the screw machine. The connector rod is selectively moved axially to tighten the brake band member about the brake drum member for stopping rotational movement of the main drive shaft.

4 Claims, 3 Drawing Figures

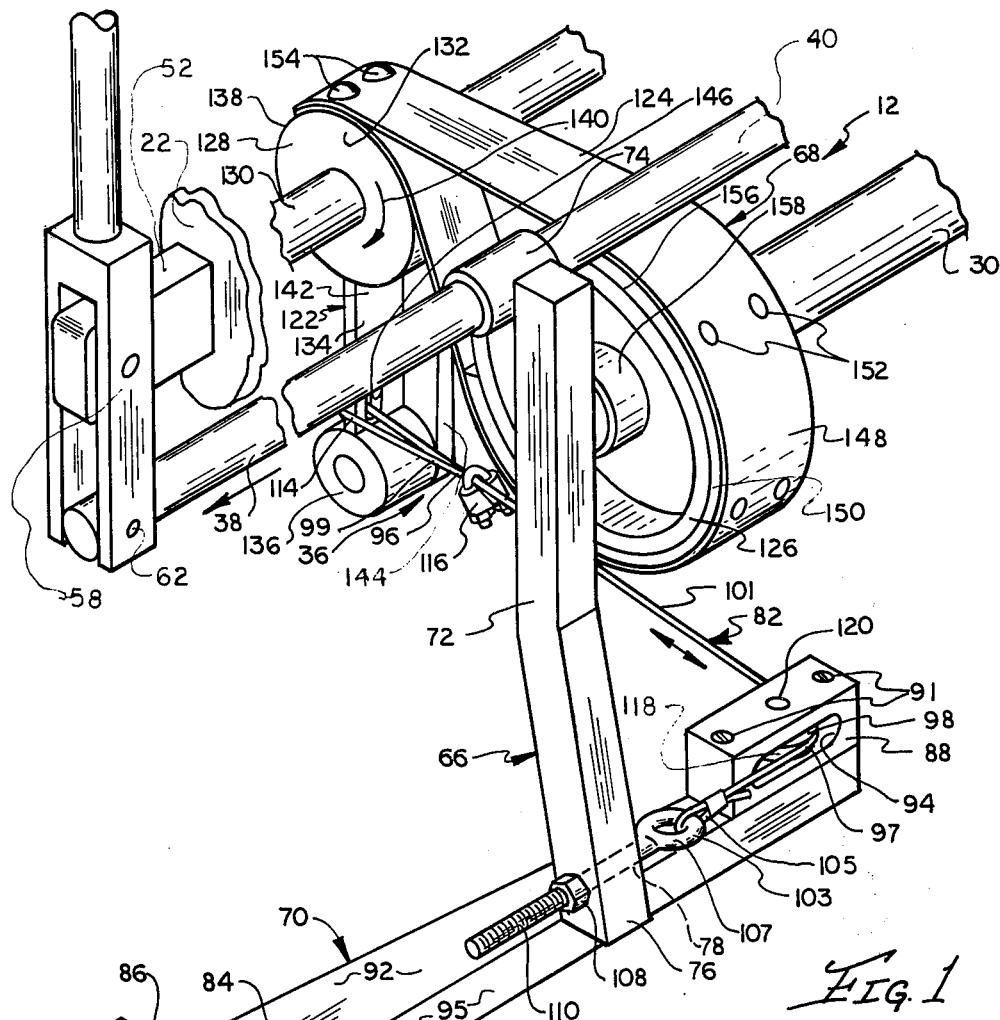
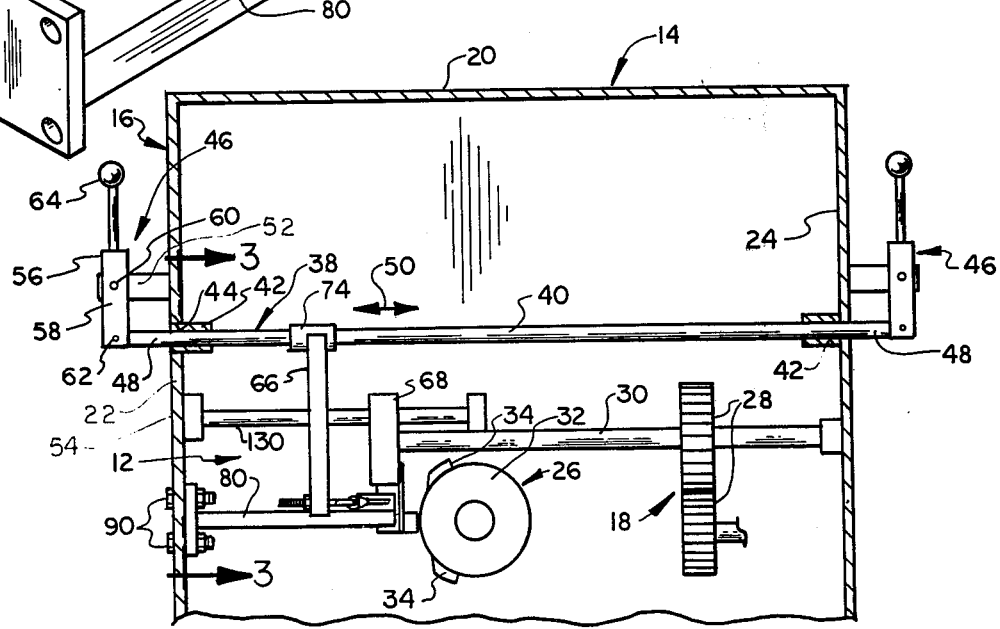
Fig. 1
Fig. 2

BRAKE APPARATUS FOR A SCREW MACHINE

PRIOR ART

A patent search on the subject invention revealed the following U.S. Pat. Nos. 352,775 Ostrom, 1,173,162 Bassett, 1,429,655 Stenzel, Jr., 2,709,509 Haywood, 3,438,473 Rohrbacher.

The Haywood patent teaches a stop system on a cutting machine for a safety device. All of the patents were considered but they are not operable similar to applicant's invention claimed herein.

PREFERRED EMBODIMENT OF THE INVENTION

The brake apparatus of this invention is a supplemental brake system for a screw machine and, more particularly, for a Model RA-6 Acme Gridley Screw Machine. The brake apparatus is operable to control stoppage of the main power drum in a desired position which is not possible with the main brake system on a screw machine. The brake apparatus includes an actuator assembly connected to a brake assembly. The actuator assembly includes (1) an elongated connector rod having outer ends each mounted in bearing members which, in turn, are carried in a housing of the screw machine, and (2) an actuator handle assembly connected to each opposite end of the connector rod. The actuator handle assemblies each extend outwardly of the housing and are operable to selectively move the connector rod axially. The brake apparatus includes 1) an actuator arm assembly connected to the connector rod; 2) a brake band assembly mounted in the housing and operably connected to the main power drum; and 3) a support and linkage assembly interconnecting the actuator arm assembly to the brake band assembly. The actuator arm assembly includes a support arm member having a connector coupling at one end secured to the connector rod for conjoint movement therewith. The support and linkage assembly includes a main support body secured to an inside wall of the housing and a linkage assembly connected at one end to the support arm member, operably associated with the main support body and an opposite end connected to the brake band assembly. The linkage assembly inlcudes a connector cable which is moved axially by the support arm member to selectively release and actuate the brake band assembly. The brake band assembly includes an actuator weight arm assembly pivotally mounted on a support shaft; a band member connected to the actuator arm and mounted about a brake drum member which, in turn, is connected to a main drive shaft; and a brake band mounted between the band member and the brake drum member. It is noted that the actuator handle assembly is actuated to move the connector rod which, in turn, moves the main support body and interconnected linkage assembly. This then pivots the actuator weight arm assembly to apply a braking force to the brake drum member and main drive shaft to stop rotational movement thereof in an exact position.

OBJECTS OF THE INVENTION

One object of this invention is to provide a brake apparatus usable on conventional screw machines as a supplemental brake system to stop rotation of a main drive drum in an exact manner.

Another object of this invention is to provide a brake apparatus for a screw machine that is readily attached to existing structures to provide a precise braking system.

Still, one other object of the invention is to provide a brake apparatus for a mchine tool to stop rotational movement of a drive shaft with a minimum of effort in an exact position.

One other object of this invention is to provide a brake apparatus utilizing a band member about a brake drum member to stop rotation thereof with a minimum amount of effort.

One last object of this invention is to provide a brake apparatus that is easy to install, sturdy in construction, easy to use, and economical to manufacture.

Various other objects, advantages, and features of the invention will become apparent to those skilled in the art from the following discussion, taken in conjunction with the accompanying drawings, in which:

FIGURES OF THE INVENTION

FIG. 1 is a perspective view of a brake apparatus of this invention as connected to a drive shaft of a screw machine;

FIG. 2 is a fragmentary sectional view of the screw machine illustrating the brake apparatus of this invention connected thereto;

Figure 3:
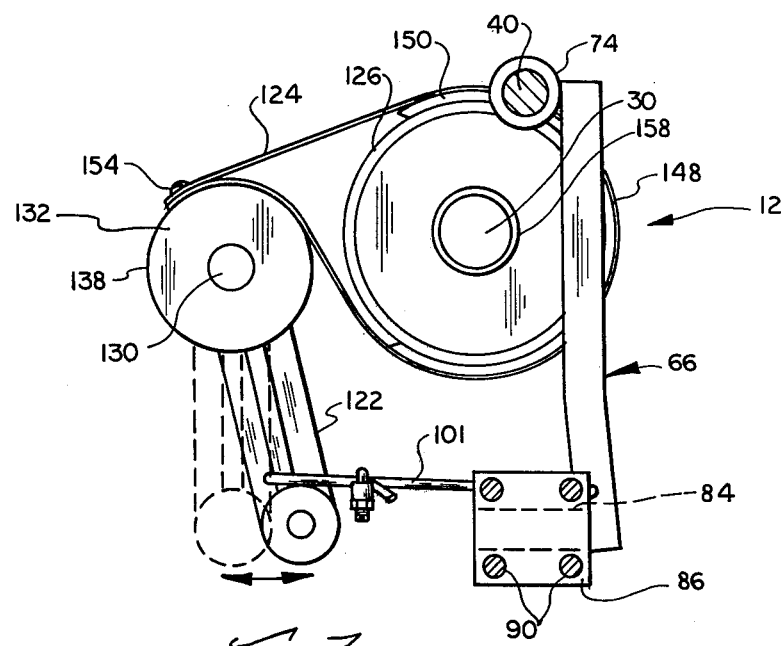
FIG. 3 is a fragmentary sectional view taken along line 3—3 in FIG. 2.

The following is a discussion and description of preferred specific embodiments of the new brake apparatus for a screw machine of this invention, such being made with reference to the drawings, whereupon the same reference numerals are used to indicate the same or similar parts and/or structure. It is to be understood that such discussion and description is not to unduly limit the scope of the invention.

SPECIFICATION OF THE INVENTION

Referring to the drawings in detail, a brake apparatus of this invention, indicated generally at 12, is shown in FIG. 2 as secured to a screw machine 14. The screw machine 14 includes a housing member 16 having a power assembly 18 mounted therein. The housing member 16 includes a top wall 20 integral with opposed sidewalls 22, 24. The power assembly 18 includes a conventional power drive means 26 operable to rotate intermeshing gear members 28 which, in turn, rotates a drive shaft 30. The power drive means 26 is operable to rotate a drive drum 32 having cam portions 34 thereon which are part of the first brake system (not shown) of the screw machine 14.

The brake apparatus 12 includes a brake assembly 36 operably connected to the drive shaft 30 to selectively control rotation thereof and put into operation by an actuator assembly 38. The actuator assembly 38 includes an elongated connector rod 40; bearing members 42 mounted in opposed holes 44 in the sidewalls 22, 24 to support opposite ends of the connector rod 40; and an actuator handle assembly 46 connected to each outer end of the connector rod 40.

The connector rod 40 has outer end sections 48 extended laterally of the respective sidewalls 22, 24. The connector rod 40 is selectively movable axially as shown by an arrow 50 for reasons to be explained.

As shown in FIG. 2, each actuator handle assembly 46 includes a support lug 52 secured to a surface 54 of respective sidewalls 22, 24; and a handle member 56 having a mid-portion 58 pivotally connected by a bolt member 60 to the support lug 52 and, further, pivotally connected by a connector member 62 to the respective outer end sections 48 of the connector rod 40. The handle member 56 is of a conventional nature found on screw machines having an upper circular knob 64 for ease of grasping to pivot about the support lug 52 to axially move the connector rod 40.

As shown in FIG. 1, the brake assembly 36 includes 1) an actuator arm assembly 66 connected to the connector rod 40; 2) a brake band assembly 68 operably connected to the drive shaft 30; and 3) a support and linkage assembly 70 mounted on the sidewall 22 and interconnecting the actuator arm assembly 66 to the brake band assembly 68.

The actuator arm assembly 66 includes a support arm member 72 having a connector coupling 74 secured to an upper end thereof. The connector coupling 74 is mounted about and anchored to the connector rod 40 so as to be movable laterally therewith.

The support arm member 72 is preferably constructed of square tubular material having a lower section 76 provided with a hole 78 therein for attachment to the support and linkage assembly 70 in a manner to be described.

The support and linkage assembly 70 includes 1) a main support assembly 80 connected to the sidewall 22; and 2) a linkage assembly 82 connected to the support arm member 72, the main support assembly 80 and the brake band assembly 68.

The main support assembly 80 includes a support member 84 having an anchor plate 86 secured to one end and a support block 88 secured to the other end. The support member 84 extends in a horizontal plane with the anchor plate 86 secured by four (4) nut and bolt members 90 to the sidewall 22.

As shown in FIG. 1, the support block 88 is connected by spaced screw members 91 to a top surface and outer end of the support member 84. The support block 88 is formed with a cut-out opening 94 therethrough for reasons to be explained.

As noted in FIG. 1, a lower end of the main support arm member 72 contacts a vertical surface 95 of the support member 84 to provide a guide when the connector rod 40 is moved axially by respective ones of the handle members 56.

The linkage assembly 82 includes a connector cable assembly 96 having one end section adjustably connected to the support arm member 72. A mid-portion 97 trained about a pulley assembly 98; and the other end section 99 connected to the brake band assembly 68. More specifically, the connector cable assembly 96 includes a cable member 101 connected to one end to the support arm member 72 by an anchor assembly 103. The one end of the cable member 101 is formed with a loop 105 and connected to an eye bolt 107 which is part of the anchor assembly 103. The eye bolt 107 is extended through the hole 78 in a lower end of the support arm member 72. The eye bolt 107 includes a nut 108 adjustably mounted on a threaded end section 110 for reasons to be explained.

The other end section 99 of the cable member 101 is formed with a loop 114 held in this condition by a conventional cable clamp member 116.

The pulley assembly 98 includes a pulley member 118 mounted between the support member 84 and the support block 88 and mounted on a pulley shaft 120 for rotational movement thereabout.

The brake band assembly 68 includes 1) an actuator weight arm assembly 122 connected to the end section 99 of the cable member 101; 2) a brake band member 124 secured to the actuator weight arm assembly 122; and 3) a brake drum member 126 mounted on the drive shaft 30 of the screw machine 16 and surrounded by the brake band member 124.

The actuator weight arm asssembly 122 includes an actuator arm member 128 mounted on a support shaft 130 for pivotal movement thereabout a central axis thereof. The actuator arm member 128 is of irregular shape having a main cylindrical section 132 integral with a mid-section 134 which, in turn, is integral with a connector section 136. The cylindrical section 132 includes an outer connector surface 138 and may be biased toward a release condition as shown by an arrow 140 through the use of a spring member (not shown).

The mid-section 134 is formed with a first plate 142 and a transverse plate 144 secured to the first plate for rigidity. The transverse plate 144 has a slot 146 to receive the end section 99 of the cable member 101 for connection thereto.

The connector section 136 is constructed of a heavy material so as to form a weight that tends to rotate the entire actuator arm member 128 from the position of FIG. 3 to that shown in dotted lines in FIG. 3. This is the "brake release" condition and the use of the weighted connector section 136 would eliminate the need of a spring member to bias same to this condition as it acts similar to a clock pendulum.

The brake band member 124 includes an elongated band support member 148 having a brake band 150 secured thereto by a plurality of rivet members 152. The band support member 148 has both ends joined together and anchored by a pair of connector members 154 to the connector surface 138 of the cylindrical section 132.

The brake band 150 is mounted about an outer surface 156 of the brake drum member 126 to create friction contact therewith to stop rotation of the drive shaft 30 when utilized in a manner to be disclosed.

The brake drum member 126 resembles a wheel structure having a central hub 158 mounted on the drive shaft 30 so as to rotate conjointly therewith.

USE AND OPERATION OF THE INVENTION

The brake apparatus 12 of this invention was designed for use on an Acme Gridley Screw Machine but can be mounted on any such machine for the purpose of providing another braking system in order to stop a rotating drive shaft in a precise position.

With the brake apparatus 12 installed on the screw machine 14 as shown in FIGS. 1 and 2, the same is in the "brake release" condition with the mid-section 134 of the actuator arm member 128 extended in a generally vertical plane. This is the condition shown in dotted lines in FIG. 3.

On applying a braking action to the drive shaft 30 and the brake drum member 126, either of the handle members 56 can be grasped to move the connector rod 40 as shown by an arrow 162 in FIG. 1. This causes the cable member 101 to pivot the actuator arm member 128 to the "brake applied" condition as shown in solid lines in FIG. 3. Obviously, the brake band member 124 grasps the outer surface 156 of the brake drum member 126 to cause a braking action to the drive shaft 30. A larger application of pressure against the handle member 56 causes greater contact between the brake band member 124 and the brake drum member 126 to control the rate of slowing rotational movement of the drive shaft 30. This design is operable to precisely control stopping of the drive shaft 30 and associated machine tools in an accurate relationship which is not obtainable on the primary brake system on screw machines and the like.

On release of the handle member 56, the actuator arm member 128 is moved to the "brake release" condition (dotted lines in FIG. 3) by 1) the use of a spring member attached thereto; or 2) the weight of the connector section 136 acting like a pendulum on a clock.

It is noted that the contact between the brake band member 124 and the brake drum member 126 can be adjusted by axial movement of the cable member 101 through the eye bolt 107 and nut 108 in an obvious manner.

The brake apparatus of this invention is easy to install on existing screw machines and other such devices need a supplemental brake system. The brake apparatus is simple in operation, durable in construction, and substantially maintenance free.

While the invention has been described in conjunction with preferred specific embodiments thereof, it will be understood that this description is intended to illustrate and not to limit the scope of the invention, which is defined by the following claims.

I claim:

1. A brake apparatus operably connected to a drive shaft on a power machine structure to accurately cease rotation of said drive shaft, comprising:
   (a) a brake assembly mounted in the power machine and connected to a brake drum member which is secured to said drive shaft;
   (b) an actuator assembly connected to said brake assembly to selectively actuate same from brake release positions to brake applied positions with said brake drum member;
   (c) said brake assembly includes 1) an actuator arm assembly connected to said actuator assembly for movement therewith, 2) a brake band assembly connected to said brake drum member operable to selectively retard rotation of said drive shaft and interconnected brake drum member, and 3) a support and linkage assembly connected between said actuator arm assembly and said brake band assembly being operable to operate said brake band assembly on actuation of said actuator assembly;
   (d) said actuator assembly includes a connector rod having a portion thereof extended laterally of a sidewall of the power machine;
   (e) a handle member connected to said portion and operable to selectively move said connector rod axially;
   (f) said support and linkage assembly includes a main support body connected to said sidewall; a pulley member connected to said main support body; and a cable member having a midportion trained about said pulley member; and
   (g) said actuator arm assembly includes a support arm member having one end secured by a connector coupling to said connector rod and another end connected to one end of said cable member with the other end of said cable member connected to said brake band assembly for actuation thereof on axial movement of said connector rod.

2. A brake apparatus as described in claim 1, wherein:
   (a) said brake band assembly includes a brake band member mounted about the periphery of said brake drum member and connected to an actuator weight arm assembly having an actuator arm member pivotal about an axis;
   (b) said actuator arm member connected to said other end of said cable member for pivotal movement thereby about said axis in one direction to apply braking pressure between said brake band member and said brake drum member;
   (c) said actuator arm member includes 1) a main cylindrical section having a center thereof pivotal about said axis; 2) a depending mid-section with one end integral with said cylindrical section; and 3) a connector section integral with another end of said mid-section; and
   (d) said actuator arm member moved to the brake release condition under force of gravity which moves said connector section to a vertically aligned position relative to said mid-section; whereby said actuator arm member resembles the pendulum on a clock being movable about said axis.

3. A brake apparatus as described in claim 1, wherein:
   (a) said cable member having an adjustable connector member mounted on said one end for adjustable connection to said one end of said cable member and said another end of said support arm member; and
   (b) said adjustable connector member operable to selectively adjust axial movement of said connector rod to create or release pressure between said brake band assembly and said brake drum member.

4. A brake apparatus operably connected to a drive shaft on a power machine structure to accurately cease rotation of said drive shaft, comprising:
   (a) a brake assembly mounted in the power machine and connected to a brake drum member which is secured to said drive shaft;
   (b) an actuator assembly connected to said brake assembly to selectively actuate same from brake release positions to brake applied positions with said brake drum member;
   (c) said brake assembly includes 1) an actuator arm assembly connected to said actuator assembly for movement therewith, 2) a brake band assembly connected to said brake drum member operable to selectively retard rotation of said drive shaft and interconnected brake drum member, and 3) a support and linkage assembly connected between said actuator arm assembly and said brake band assembly being operable to operate said brake band assembly on actuation of said actuator assembly;
   (d) said actuator assembly includes a connector rod having a portion thereof extended laterally of a sidewall of the power machine;
   (e) a handle member connected to said portion and operable to selectively move said connector rod axially;
   (f) said actuator arm assembly includes a support arm member having one end secured by a connector coupling to said connector rod and another end connected to said support and linkage assembly to move same and said brake band assembly on axial movement of said connector rod;
   (g) said support and linkage assembly includes a main support body connected to said sidewall; a pulley member connected to said main support body; and a cable member having one end secured to said another end of said support arm member, a midportion of said cable member is trained about said pulley member, and another end of said cable member is connected to said brake band assembly for actuation thereof;

(h) said cable member having an adjustable connector member mounted on said one end for adjustable connected to said one end of said cable member and said another end of said support arm member; and (i) said adjustable connector member operable to selectively adjust axial movement of said connector rod to create or release pressure between said brake band assembly and said brake drum member.

* * * * *